May 12, 1942. C. C. CALKINS ET AL 2,282,560
WEEDER
Filed May 31, 1941 2 Sheets-Sheet 1

Inventors:
Claude C. Calkins
and Laurence A. Hunt,
By Soans, Pond, & Anderson,
Attorneys.

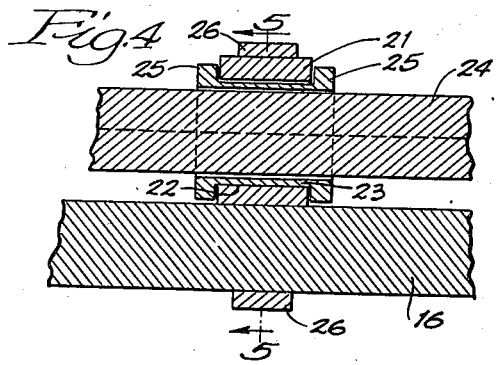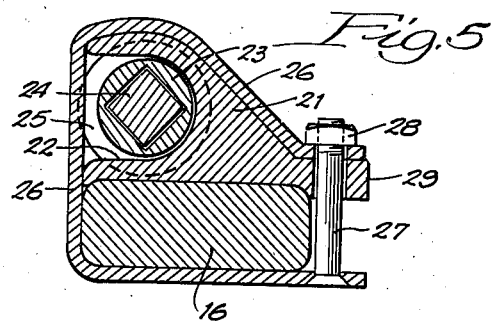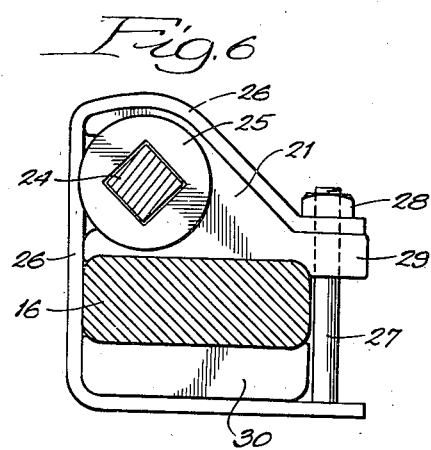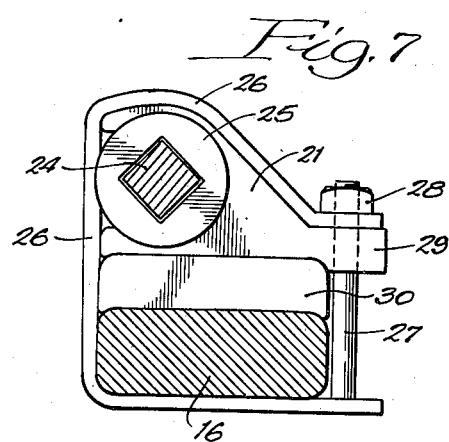

Patented May 12, 1942

2,282,560

UNITED STATES PATENT OFFICE 2,282,560

WEEDER

Claude C. Calkins and Laurence A. Hunt, Spokane, Wash., assignors to Calkins Manufacturing Company, a corporation of Washington Application May 31, 1941, Serial No. 395,986

12 Claims. (Cl. 97—42)

This invention relates to weeders of the general type disclosed in patents to Claude C. Calkins, No. 1,818,532, Aug. 11, 1931, and No. 1,910,881, May 23, 1933, wherein the weeding tool consists of a rod of square cross-section journaled in the lower ends of a gang of parallel longitudinal gooseneck beams and rotating in a backward direction relative to the direction of travel of the machine beneath the surface of the ground, to uproot and throw backward weeds, grain stubble, and the like.

In later applications of the said Claude C. Calkins, Serial No. 364,007, filed Nov. 2, 1940, and Serial No. 385,236, filed March 26, 1941, there are disclosed improvements on the weeders of the aforesaid patents, consisting mainly of a bar mounted on and crosswise of bracket plates attached to the forward ends of the goosenecks, and a gang of closely adjacent shovels has been employed for breaking up the ground in advance of the rotary weeder rod, said shovels being mounted on shanks which are bolted to said bar and extend across the weeder rod.

Our present invention is an improvement on weeders of the type disclosed in the aforesaid applications, and is primarily concerned with a new and improved position or location of the rotary weeder rod; as a result of which the weeds are more effectively uprooted and killed. In the machines of both the aforesaid applications the weeder rod is located between the bar and the rear ends of the gang of shovels, and so low that most of the weed-carrying soil is raised and streamlined over the rod, so that the latter fails to extirpate and kill a large percentage of the weeds. It has been the main object of the present invention to provide a new and improved assembly of bar, weeder rod and shovels, in a weeder of this type, by which the weeds will be much more effectively uprooted and killed. In accordance with the principle of this invention the weeder rod is mounted above and substantially parallel with the bar, so that it catches the weeds nearer the surface of the ground upraised by the shovels and thus more effectively destroys and throws back the weeds onto the broken surface of the ground upraised by the shovels. In the embodiment of the invention herein shown and described the weeder rod is journaled in bearings mounted on and overlying the bar and adjustable lengthwise of the bar so that they can be spaced and set at desirable positions, preferably midway between adjacent shovel shanks. In the preferred form of the invention the weeder rod bearings are also vertically adjustable, so that the rod can be made to operate closer to the surface or deeper, depending on the character of the weeds and stubble encountered on any given job.

Approved embodiments of the invention are illustrated in the accompanying drawings, in which—

Fig. 4 is a vertical section taken on the line 4—4 of Fig. 3.

Fig. 5 is a vertical section taken on the line 5—5 of Fig. 4.

Figs. 6 and 7 are views similar to Fig. 3 (with the shovel omitted) of a vertically adjustable bearing for the weeder rod; Fig. 6 showing a low adjustment and Fig. 7 a higher adjustment.

Figure 1:
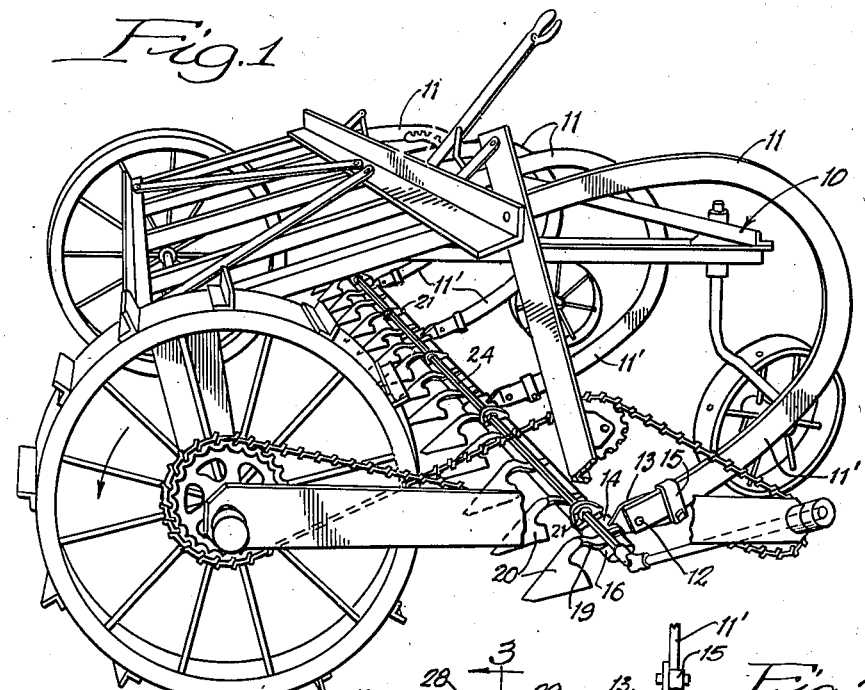
Fig. 1 is a perspective view, partly broken out on its near side, of a rod weeder equipped with our present improvements.

Referring to the drawings, in Fig. 1 we have shown in perspective a rod weeding machine embodying our present improvements, said machine including a frame structure designated as an entirety by 10, rigidly mounted in which frame are a gang of rearwardly extending parallel longitudinal beams 11, that terminate at their rear ends in depending gooseneck portions 11'.

Figure 2:
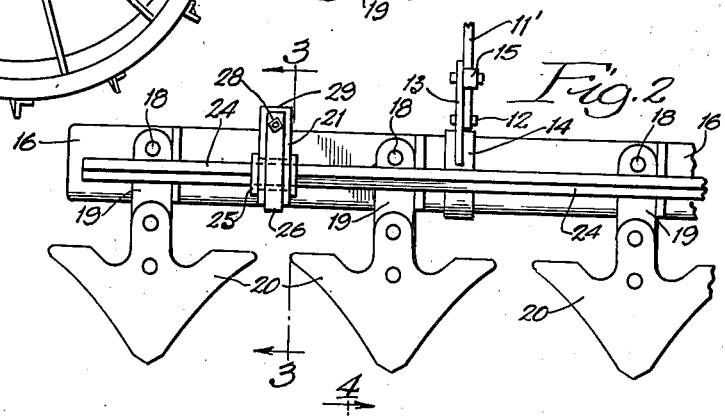
Fig. 2 is a fragmentary top plan view of the ground-engaging elements of the machine shown in Fig. 1.

Vertically mounted, as by a pivot bolt 12 (Fig. 2) on the forward end of each gooseneck 11' is a bracket plate 13. This bracket plate has, rigid with its forward end, a horizontally oblong collar 14 of considerably greater width than the plate 13, which collar may be cast or forged integral with the plate 13, or it may be welded to the plate. Bracket plate 13 may be adjusted angularly in a vertical plane on its pivot bolt 12 and secured in such adjusted position by an adjustable clamp 15, so as to vary the pitch of the shovels hereinafter referred to.

Supported by the collars 14 of the several bracket plates is a bar 16 which lies crosswise of the goosenecks 11' and fits the several collars 14, and may be locked to the latter as by set screws or otherwise.

Attached to the bar 16 as by bolts 18 (Fig. 3) are the rear ends of the shanks 19 of a plurality of closely adjacent shovel plates 20.

The parts thus far described are borrowed from the machine disclosed in the aforesaid Calkins application, Serial No. 385,236. In the aforesaid application, and also the aforesaid Calkins application, Serial No. 364,007, the shanks of certain of the shovels are formed with bearings for the rotary weeder rod, so that the weeder rod lies between the forward edge of the bar and the rear ends of the shovels. As before stated, according to our present improvements the bearings of the weeder rod are mounted above the bar 16, so as to cause the weeder rod to occupy a higher position nearer the surface of the ground through which the shovels move.

Figure 3:
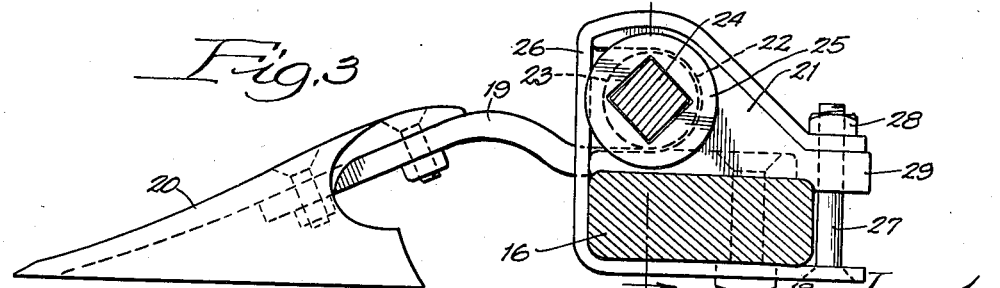
Fig. 3 is an enlarged vertical section taken on the line 3—3 of Fig. 2.

Referring now more particularly to Figs. 3, 4, and 5, for a description of one of the new weeder rod bearings, 21 designates a bearing, preferably a casting, that is mounted on and transversely of the bar 16. In this bearing 21 is a transverse opening 22 that opens through the front of the bearing and accommodates a spool or bushing 23 for the rotary weeder rod 24, the bore of the spool 23 being rectangular to fit the rectangular rod 24. The heads 25 of the spool overlap the sides of the bearing 21 so as to prevent endwise displacement of the spool. Encircling the noncontiguous sides of the bearing 21 and bar 16 is a metal strap 26, the ends of which are drawn together to tighten the strap on the parts which it embraces by a bolt 27 and a nut 28; this bolt passing through an apertured lug 29 integral with the rear side of the bearing 21. The bearing opening 22 is about ⅛ inch larger than the diameter of the spool to permit dirt to escape.

It will be seen that the above described structure mounts the rotary weeder 24 above and parallel with the top side of the bar 16, with its axis substantially in the horizontal plane of the tops of the shovels 20, so that the weeder rod is directly in the path of, and breaks up, the surface layer of earth that is streamlined over the tops of the shovels, thus shaking out the roots of weeds, so that the latter will die. This is a much more favorable position for the weeder rod to destroy the weeds than its former position between the bar and the shovels.

Manifestly, in a weeder of this type, it is desirable to be able to adjust the vertical position of the weeder rod, according to the nature of the ground encountered. Figs. 6 and 7 illustrate a simple adjustable form of weeder rod bearing, wherein the same bearing 21, bar 16, strap 26, and tightening bolt and nut 27, 28, are employed, but strap 26 and bolt 27 are sufficiently longer to accommodate the presence of a filler block 30. If the bearing of the weeder rod is to have a low mounting, the filler block 30 is inserted between the bar 16 and the bottom limb of the strap 26. If, on the other hand, the weeder rod bearing is to have a higher position, nearer the surface of the ground, then the filler block 30 is withdrawn, inverted, and inserted between the bearing block 21 and the top of the bar 16, as shown in Fig. 7. Other means for raising and lowering the weeder rod bearings may, of course, be employed; the means herein shown and described being intended simply as one very simple and easily manipulated adjusting means. The strap 26 extends across and closes the open front end of the bearing opening 22, thus preventing escape of the spool from the bearing.

Still other forms and structures of weeder rod bearings may be resorted to within the purview of this invention, so long as the broad principle of mounting said bearings above the bar, such as 16, to which the shovel shanks are attached, so that the layer of earth discharged by the shovels will collide with the weeder rod, is maintained.

I claim:

1. In a weeder of the class described, having a gang of longitudinal beams terminating at their rear ends in goosenecks, the combination of a bar attached to and crosswise of the lower ends of said goosenecks, a group of shovels having shanks attached to and extending forwardly of said bar, and a rotary weeder rod mounted parallel with and over and in the same vertical plane as said bar.

2. In a weeder of the class described having a gang of longitudinal beams terminating at their rear ends in goosenecks, the combination of a bar attached to and crosswise of the lower ends of said goosenecks, a group of shovels having shanks attached to and extending forwardly of said bar, bearings mounted on and overlying said bar, and a rotary weeder rod mounted in said bearings.

3. In a weeder of the class described, having a gang of longitudinal beams terminating at their rear ends in gosenecks, the combination of a bar attached to and crosswise of the lower ends of said goosenecks, a group of shovels having shanks attached to and extending forwardly of said bar, bearings mounted on and overlying said bar and adjustable sidewise along the latter, and a rotary weeder rod mounted in said bearings.

4. In a weeder of the class described, having a gang of longitudinal beams terminating at their rear ends in goosenecks, the combination of a bar attached to and crosswise of the lower ends of said goosenecks, a group of shovels having shanks attached to and extending forwardly of said bar, bearings mounted on and above said bar and disposed respectively substantially midway between adjacent shovel shanks, and a rotary weeder rod mounted in said bearings.

5. In a weeder of the class described, having a gang of longitudinal beams terminating at their rear ends in goosenecks, the combination of a bar attached to and crosswise of the lower ends of said goosenecks, a group of shovels having shanks attached to and extending forwardly of said bar, vertically adjustable bearings mounted on and overlying said bar, and a rotary weeder rod mounted in said bearings.

6. An embodiment of claim 2, wherein each of the weeder rod bearings comprises a bearing member mounted on the bar and formed with a transverse opening, a spool encircling the weeder rod journaled in said opening, and a strap encircling said bar and bearing member.

7. An embodiment of claim 2, wherein each of the weeder rod bearings comprises a bearing member mounted on the bar and formed with a transverse opening, a spool encircling the weeder rod journaled in said opening, a strap encircling said bar and bearing member, and means for tightening said strap.

8. An embodiment of claim 2, wherein each of the weeder rod bearings comprises a bearing member mounted on the bar and formed with a transverse opening, a spool encircling the weeder rod journaled in said opening, a strap encircling said bar and bearing member, and a bolt and nut connected to opposite ends of said strap for drawing the latter tight around said bar and bearing member.

9. An embodiment of claim 2, wherein each of the weeder rod bearings comprises a bearing member mounted on the bar and formed with a transverse opening having an opening through a side of the bearing member, a spool encircling the weeder rod journaled in said transverse opening, said weeder rod and spool being insertable sidewise through said side opening and a strap encircling said bar and bearing member and extending across said side opening to confine said spool against escape through said side opening.

10. An embodiment of claim 5, wherein each of the vertically adjustable weeder rod bearings comprises a bearing member mounted above the bar and formed with a transverse opening, a spool encircling the weeder rod journaled in said opening, a filler block disposed crosswise of and in contact with said bar, and a strap encircling said bearing member, bar, and filler block and bonding said parts together; said filler block adapted to fit between said bar and the bottom limb of said strap to effect a low adjustment of the weeder rod relatively to said bar, and between said bearing member and said bar to effect a higher adjustment of the weeder rod relatively to said bar.

11. In a weeder of the class described, the combination of a bar, a group of shovels having shanks attached to and extending forwardly of said bar, and a rotary weeder rod mounted parallel with and over and in the same vertical plane as said bar.

12. In a weeder of the class described, the combination of a bar, a group of shovels having shanks attached to and extending forwardly of said bar, bearings mounted on and overlying said bar, and a rotary weeder rod mounted in said bearings.

CLAUDE C. CALKINS.
LAURENCE A. HUNT.